(12) United States Patent
Lemaire et al.

(10) Patent No.: US 10,071,520 B2
(45) Date of Patent: Sep. 11, 2018

(54) MOLDING UNIT FOR MANUFACTURING CONTAINERS FROM PREFORMS MADE OF PLASTIC MATERIAL

(71) Applicant: SIDEL PARTICIPATIONS, Octeville-sur-mer (FR)

(72) Inventors: Cedric Lemaire, Octeville-sur-mer (FR); Olivier Alix, Octeville-sur-mer (FR); Frederic Brachais, Octeville-sur-mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 126 days.

(21) Appl. No.: 15/111,159

(22) PCT Filed: Feb. 4, 2015

(86) PCT No.: PCT/EP2015/052262
§ 371 (c)(1),
(2) Date: Jul. 12, 2016

(87) PCT Pub. No.: WO2015/121120
PCT Pub. Date: Aug. 20, 2015

(65) Prior Publication Data
US 2016/0339623 A1    Nov. 24, 2016

(30) Foreign Application Priority Data
Feb. 13, 2014    (FR) ...................... 14 51118

(51) Int. Cl.
*B29C 49/58*    (2006.01)
*B29C 49/12*    (2006.01)
(Continued)

(52) U.S. Cl.
CPC .............. *B29C 49/58* (2013.01); *B29C 49/12* (2013.01); *B29C 49/36* (2013.01);
(Continued)

(58) Field of Classification Search
CPC ............ B29C 49/58; B29C 2049/5803; B29C 2049/5875; B29C 2049/5896
See application file for complete search history.

(56) References Cited

U.S. PATENT DOCUMENTS 6,464,486 B1    10/2002  Barray et al.
8,192,656 B2    6/2012   Adriansens
(Continued)

FOREIGN PATENT DOCUMENTS

DE    10 2008 025775 A1    12/2009
EP    2 117 807 B1         4/2013
(Continued)

OTHER PUBLICATIONS

International Search Report, dated May 20, 2015, from corresponding PCT Application.

*Primary Examiner* — Robert B Davis
(74) *Attorney, Agent, or Firm* — Young & Thompson

(57) ABSTRACT

A molding unit (10) for manufacturing preforms (100) made of plastics material, includes at least one "HR"-type mold (10), a nozzle (14) including at least a nozzle body (28) and a nozzle orifice (30) incorporating a preform (100) stabilizer (34) that forms with a tubular member (40) a mobile assembly that is able to slide axially relative to the nozzle orifice (30) between at least a top position and a bottom position, wherein the tubular member (40) is guided so as to slide axially with respect to the nozzle body (28) by at least one guiding element (46) which is interposed radially between the nozzle body (28) and the tubular inlet member (40), and the stabilizer (34), fixed to the tubular member (40), is guided with respect to the nozzle body (28) only by way of the at least one guiding element (46).

16 Claims, 6 Drawing Sheets

(51) Int. Cl.
  *B29C 49/36*   (2006.01)
  *B29C 49/48*   (2006.01)
  B29C 49/06    (2006.01)
  B29L 31/00    (2006.01)

(52) U.S. Cl.
  CPC .......... *B29C 49/4823* (2013.01); *B29C 49/06* (2013.01); *B29C 2049/4838* (2013.01); *B29C 2049/4892* (2013.01); *B29C 2049/5803* (2013.01); *B29C 2049/5875* (2013.01); *B29C 2049/5896* (2013.01); *B29L 2031/712* (2013.01)

(56) References Cited

U.S. PATENT DOCUMENTS

| | | | |
|---|---|---|---|
| 9,364,991 B2 * | 6/2016 | Duclos | .................... B29C 49/58 |
| 2010/0143531 A1 | 6/2010 | Derrier et al. | |
| 2010/0159058 A1 | 6/2010 | Doudement | |
| 2014/0377394 A1 | 12/2014 | Le Pechour et al. | |

FOREIGN PATENT DOCUMENTS

| | | | | |
|---|---|---|---|---|
| FR | 2 764 544 A1 | 12/1998 | | |
| FR | 3031324 A1 * | 7/2016 | ............. | B29C 49/58 |
| WO | 2013/093335 A1 | 6/2013 | | |
| WO | WO-2013143848 A1 * | 10/2013 | ............. | B29C 49/58 |

* cited by examiner

MOLDING UNIT FOR MANUFACTURING CONTAINERS FROM PREFORMS MADE OF PLASTIC MATERIAL

This invention relates to a molding unit for manufacturing containers from preforms made of plastic material.

This invention relates more particularly to a molding unit for manufacturing containers by blow molding or by stretch blow molding from preforms made of plastic material comprising a neck equipped with a rim circumferentially delimiting an opening for access inside said preform.

BACKGROUND OF THE INVENTION

Field of the Invention

Such molding units mounted on a machine for manufacturing containers by blow molding or by stretch blow molding from preforms made of plastic material, such as PET, are known from the state of the art.

The manufacturing machines have in particular, but not exclusively, a "rotary" design and comprise a carrousel that is circumferentially provided with a given number of container molding units.

The manufacturing of containers made of plastic material, such as bottles, flasks, pots, etc., is carried out there from preforms that, manufactured in advance by injection-molding of plastic material, are subsequently heated in a thermal conditioning oven. As a variant, the preforms are manufactured by extrusion and then directly transformed into containers in the molding unit.

In a "rotary" manufacturing machine, each molding unit comprises at least one mold that is generally of the so-called "portfolio" design, with said mold respectively consisting of two half-molds supported by two mold carriers, at least one of which is mounted to move in relation to the other around an axis of rotation, in particular of vertical orientation.

Hereinafter, the term "preform" is used in a generic manner and also encompasses in this connection an intermediate container that has undergone at least one preliminary blow molding, with or without stretching.

During the manufacturing phase, depending on the impression number of the mold, one or more preform(s) is/are brought into the machine (also called a "blower") to be inserted into the mold of one of the molding units with which forming means are associated by application of at least one gaseous and/or liquid pressurized fluid.

The forming (or shaping) of the hot preform is generally achieved by blow molding or by stretch blow molding by means of at least one gaseous and/or liquid pressurized fluid, such as air, at a pressure of between 20 and 40 bars.

The forming means associated with the mold of the unit are produced, for example, in the form of a blow-molding nozzle.

Description of the Related Art

The document FR-A-2,764,544 describes an example of a blow-molding nozzle, and reference will be made to further details on the general operation of a nozzle.

In a molding unit comprising at least one mold associated with a blow-molding nozzle, it is also known to use a stabilizer, for example formed by an insert mounted to move axially relative to the nozzle nose and housed at least in part inside said nozzle nose.

The stabilizer has as its function to ensure a correct positioning of the preform in the mold before initiating its transformation by blow molding or stretch blow molding in the mold.

Reference will be made to, for example, the document EP-2,117,807 for further details as to the use of an insert constituting such a stabilizer.

As explained in this document, the positioning defects of the preform sometimes follow rebound phenomena that take place during the installation of the preform in the mold.

The rebound of the preform in relation to the upper surface of the mold has the effect that, in some cases, the preform does not have time to become recentered by falling into the opening of the upper surface of the mold, before the nozzle covers it.

More generally, the poor positioning of the preform in the mold can also result from a phenomenon of balancing the preform that depends in particular on the type of preform (dimensions of the body, etc.) of the transfer means used to bring the preform into the mold of the molding unit.

Under such circumstances, the nozzle wedges the preform in an offset position in which the preform is blow-molded and transformed into a misshapen container, generally visually unpleasing and often unsuitable for filling and stoppering.

According to an important characteristic, this invention relates to the manufacturing of containers made of plastic material that, said to be of the "HR" type, are of a very specific type and are characterized by having heat-resistance properties that make it possible to hot-fill them.

The molds that are used in the manufacturing of such particular containers, like the containers themselves, are generally referred to by these letters "HR" corresponding to the acronym of the English term "Heat-Resistant."

Actually, to increase the resistance of the plastic material to deformation induced by the rise in temperature during a hot-filling, a solution consists in increasing the crystallinity of the material in a thermal manner.

To do this, the molding unit comprises associated heating means, such as a coolant or resistive heating elements, which are integrated into the mold to heat the impression formed in the inside wall of the mold, for example to a relatively high temperature that is greater than 100° C. and generally on the order of 130° C. to 160° C.

At the end of blow molding, the container is kept in contact for a specific period with the hot wall of the mold, and an increase in crystallinity of the material is then obtained thanks to the heat transfer taking place between the hot wall and the container. This technique is also called heat-setting ("heat set" in English).

The document WO-2013/093335 describes, in a non-limiting manner, an example of a mold for the forming of such "HR"-type containers, with the mold comprising electrical heating means formed by resistive heating elements.

Reference will advantageously be made to this document for further details on the "HR"-type molds.

In the particular case of a manufacturing of "HR"-type containers, the stabilizer equipping the blow-molding nozzle comprises blocking means that are designed to be inserted inside the neck of the preform and whose function is, by remaining there after the forming of the container, to facilitate the release of the final container by keeping it in position.

Actually, when the half-molds are radially moved away during the opening of the mold, it may happen that a part of the outside surface of the wall of the formed container adheres to the hot inside wall of the impression of the half-mold.

This is the reason for which in an "HR"-type application, the stabilizer is advantageously provided with such blocking means that work with the neck to keep the container in position.

The blocking means work with, for example, the inner cylindrical wall of the neck to immobilize the container radially.

As a result, the container is kept in position when the half-molds, pivoting around the axis of rotation of the mold, are radially moved away from one another from the closed position to the open position, and said container occupies a specific stationary position for being extracted by transfer means.

In the open position of the mold, the manufactured container is actually extracted outside of the mold by transfer means, such as a clamp ensuring that the container is gripped on the outside by its neck.

FIG. 1 shows an embodiment of a molding unit 10 for the manufacturing of "HR"-type containers so as to illustrate the state of the art known by the applicant.

FIG. 1 shows more particularly one of the molding units 10 of a machine for manufacturing "HR"-type containers, with said molding unit 10 primarily comprising an "HR"-type mold 12 and a nozzle 14 associated with said mold 12.

The "HR"-type mold 12 comprises at least two half-molds 16 that are mounted to move between at least one open position and one closed position.

In the example shown, the mold 12 is of the "portfolio" design, at least one of the half-molds 16 being mounted to move in rotation around an axis of rotation that conventionally extends here according to the axial orientation.

In the closed position shown in FIG. 1, the half-molds 16 are adjacent along a parting line P determined by their respective inner surfaces. The joined half-molds 16 together delimit an upper surface 18 of the mold 12 that centrally comprises an orifice 20 emptying into a molding cavity 22 and corresponding to the container to be manufactured.

As a variant, not shown, the mold 12 is made in three parts with a mold bottom designed for the molding of the container bottom and complementary to the half-molds 16.

The orifice 20 axially empties into the molding cavity 22 that is, in the closed position, delimited at least by a molding impression 24 that is recessed in the inner wall of each half-mold 16.

In the case of an "HR"-type mold 12, each molding impression 24 of a half-mold 16 is able to be heated by heating means 26 that, associated with the mold 12 of the molding unit 10, are—like the rest of said unit 10—diagrammatically shown in FIG. 1.

FIG. 1 also partially shows a preform 100 made of plastic material designed to be transformed in such a mold 12 by blow molding or stretch blow molding into a container, such as, here, a bottle, by means of the nozzle 14 that is associated with the "HR"-type mold 12.

The nozzle 14 comprises at least one nozzle body 28 that is stationary, in particular axially in relation to the mold 12 of the molding unit 10.

The nozzle 14 comprises a nozzle nose 30 that is mounted to move axially in relation to said nozzle body 28, respectively between a raised position above the mold 12 and a lowered blow-molding position illustrated in FIG. 1.

The nozzle 14 comprises actuating means 32 that are able to drive at least said nozzle nose 30 axially in movement between said raised and lowered positions.

In the example of FIG. 1, the actuating means 32 consist of at least one actuating jack, in particular a pneumatic jack.

In a lowered blow-molding position, said nozzle nose 30 rests against the upper surface 18 of the mold 12 that occupies its closed position.

In said lowered blow-molding position shown in FIG. 1, the nozzle nose 30 establishes an airtight connection so as to insert through an opening of a neck of a preform 100 at least one pressurized fluid inside said hot preform 100 made of plastic material.

As shown in FIG. 2 by way of nonlimiting example, the preform 100 comprises an opening 102 that is delimited by a neck 104, with said neck 104 comprising an upper circular edge, hereinafter called a rim 106.

The neck 104 comprises a collar 108 that extends radially projecting toward the outside and that is located axially at the junction of the body 110 of the preform with its neck 104.

The neck 104 of the preform 100 presents its definitive shape, i.e., that of the container, in such a way that, contrary to the body 110, the neck 104 itself is not heated so as not to undergo deformations that are likely to subsequently compromise the cooperation with a stopper for closing the container after filling.

In position in the mold 12 occupying its closed position (FIG. 1), the preform 100 rests on its collar 108 against the upper surface 18 of the mold, more specifically against the circular flange, so-called support ring, surrounding the orifice 20.

The neck 104 of the preform 100 extends axially projecting outside of the mold 12, above the upper surface 18 of the mold 12, while its body 110 extends below, inside the molding cavity 22 of the mold 12.

The body 110 of the preform 100 is closed at its end axially opposite the neck 104 by a bottom 114.

The nozzle 14 comprises a stabilizer 34 designed to keep the preform 100 in a specific reference position for the purpose of its transformation into a container.

The stabilizer 34 comprises a support surface 36 that is designed to work with the rim 106 of the neck 104 of the preform 100 shown in FIG. 1.

The nozzle 14 shown in FIG. 1 is designed to be associated with an "HR"-type mold 12.

This is the reason for which the stabilizer 34 of the nozzle 14 is equipped with blocking means 38 that are designed to be inserted inside the neck 104 and to work with the inner cylindrical wall 112 of the neck 104 to keep the manufactured container in position, most particularly during the opening of the mold 12 before initiating its extraction.

The stabilizer 34 is housed inside the nozzle nose 30 and forms, with a tubular element 40 for intake of said at least one pressurized fluid, a movable apparatus that, driven with said nozzle nose 30, is able to slide axially relative to said nozzle nose 30.

The stabilizer 34 forms with said tubular intake element 40 a movable apparatus that slides between at least one top position and one bottom position.

The movable apparatus, and more particularly the stabilizer 34, is returned elastically toward the bottom position by associated return means 42.

The return means 42 are formed by, for example, at least one compression spring that axially stresses the stabilizer 34 downward.

The stabilizer 34 is shown in FIG. 1 in the top position, in the presence of a neck 104 of the preform 100 with the rim 106 with which the stabilizer 34 works by means of its support surface 36.

In the top position, the return spring 42 is restrained by the presence of the neck 104 of the preform 100 that causes the movement of the stabilizer 34 from its bottom position toward its top position, with the compressed return spring 42 axially stressing in reaction the stabilizer 34 in the opposite direction, i.e., downward.

On the rim 106 of the neck 104 in contact with its support surface 36, the stabilizer 34 exerts an axial force provided by said spring 42 that, oriented downward, keeps the neck 104 in position by flattening in particular the collar 108 supported against the upper surface 18 of the mold 12.

The presence of heating means 26 in the "HR"-type mold 12 has the effect of creating a particular environment in terms of thermal conditions.

Actually, the nozzle nose 30 is most particularly subjected to high temperatures, in particular because of the transfer of heat that takes place upon each contact of the nozzle nose 30 with the upper surface 18 of the mold 12.

Consequently, the nozzle nose 30, like the stabilizer 34, heats up in a way such that the effect is greater the higher the manufacturing rates.

The upper surface 18 of the mold 12 like the surrounding air have a high temperature that is much greater than the ambient temperature, keeping in mind that the heating means 26 generally bear the molding impression 24 of each half-mold 16 at a temperature of greater than 100° C.

These particular thermal conditions that are suitable for the manufacturing of "HR"-type containers influence the selection of materials and the design of the nozzle 14 having to be associated with an "HR"-type mold 12.

Thus, the stabilizer 34 integrated with the nozzle 14 is a part that is made in a metal material, in particular because of the particular thermal environment of a manufacturing of "HR"-type containers.

As shown in FIG. 1, the stabilizer 34 is guided axially in sliding by working with a jacket 45 that is integral with the nozzle nose 30.

The stabilizer 34 comprises an upper segment whose outer cylindrical surface 43 works with an inner cylindrical surface 47 for guiding the jacket 45 that axially guides the stabilizer 34 during the sliding between said bottom and top positions.

The selection of the metal material of the stabilizer 34 is therefore determined taking into account expansions that will take place during the manufacturing of containers because of the above-cited thermal conditions and so as to avoid any risk of jamming, with the stabilizer 34 having to remain free to slide by being guided axially by the inner cylindrical surface 47 for guiding the jacket 45.

This is one of the reasons for which the stabilizer 34 of a nozzle 14 associated with an "HR"-type mold 12 is a part made of metal.

The use of a metal material is therefore commonplace for one skilled in the art so as to be able to ensure reliability of operation of the stabilizer 34 under thermal conditions suitable for an "HR"-type application, and in particular the reliability of the guiding in axial sliding of the stabilizer 34 in the jacket 45 of the nozzle nose 30.

However, the use of a metal material for the manufacturing of the stabilizer 34 is not without its drawbacks.

First of all, the neck 104 of a preform 100 in general and the rim 106 in particular are today increasingly fragile and this is because of the constantly sought weight reduction of the finished container, which is reflected in particular by a reduction in the quantity of material present in the neck of the preform.

The contact between the stabilizer 34 that is made of metal and the neck 104 is sometimes accompanied by impacts that can cause deterioration of the neck 104, and most particularly of the rim 106, because of the increased fragility of the necks 104 of preforms, on the one hand, and the weight of the metal stabilizer 34, on the other hand.

The use of a pneumatic jack as a means 32 for actuating the nozzle nose 30 between the raised and lowered positions also takes part in increasing this risk of deterioration of the neck 104 because of the speed of motion of the nozzle nose 30, with the contact between the stabilizer 34 and the neck 104 of the preform 100 sometimes being rough.

In the case of an "HR"-type application, the presence of the blocking means 38 carried by the stabilizer 34 is also not without consequences.

Besides the reliability of the guiding, the selection of a metal material for the stabilizer 34 is imposed on one skilled in the art who is concerned about preventing any risk of a part of the blocking means 38 rupturing.

The risk of the presence inside the container of foreign bodies consisting of a part of the stabilizer 34 is obviously not acceptable, in particular for an application in the agricultural field.

For all of the reasons presented in detail above, the use of a metal material for the production of the stabilizer 34 is always imposed on one skilled in the art in the case of an application to the manufacturing of "HR"-type containers.

At the very most, the stabilizer 34 is sometimes made of aluminum, and not of stainless steel, to reduce its weight and by so doing to reduce the risks of deterioration likely to be caused to the neck 104 during impacts that take place in particular between the blocking means 38 and the inner wall 112 of the neck 104.

BRIEF SUMMARY OF THE INVENTION

The object of this invention is in particular to resolve the drawbacks of the state of the art and to propose an enhanced "HR"-type molding unit for equipping a machine for manufacturing containers, with said unit comprising a nozzle that, associated with a mold, comprises a stabilizer that is advantageously simple, reliable, and economical.

For this purpose, the invention proposes a molding unit for the manufacturing of containers by blow molding or by stretch blow molding from preforms made of plastic material comprising a neck equipped with a rim circumferentially delimiting an opening for access inside said preform, with said molding unit comprising at least:

An "HR"-type mold that comprises at least two half-molds mounted to move between at least one open position and one closed position in which the joined half-molds delimit an upper surface comprising an orifice that empties into a molding cavity delimited at least by a molding impression of each half-mold, each molding impression being able to be heated by heating means associated with said mold, A nozzle comprising at least one nozzle body and one nozzle nose that is mounted to move axially in relation to said nozzle body between a raised position above the mold and a lowered blow-molding position, with said nozzle nose being controlled axially in movement between said raised and lowered positions by actuating means, and A stabilizer comprising a support surface designed to work with the rim of the neck and blocking means in position designed to be inserted inside the neck, with said stabilizer being housed inside the nozzle nose and forming with a tubular element for intake of at least one pressurized fluid a movable apparatus that, driven with said nozzle nose, is able to slide axially relative to said nozzle nose between at least one top position and one bottom position, characterized in that the tubular element is guided by axial sliding in relation to the nozzle body by at least one guide means that is inserted radially between said nozzle body and said tubular intake element, and in that the stabilizer, attached to said tubular element, is guided in relation to the nozzle body only by means of said at least one guide means.

The fact that the axial guiding of the stabilizer according to the invention is obtained without any part of the stabilizer itself being involved makes it possible to remove the constraints that existed heretofore on the selection of the material used for the stabilizer.

The stabilizer thus has, circumferentially with the nozzle nose, a specific radial play that is suitable for making possible thermal expansion, in particular caused by the heat transmitted to the nozzle by the "HR"-type mold.

Advantageously and by comparison with the state of the art described in FIG. 1, the stabilizer is therefore no longer necessarily made of metal to ensure the reliability of the guiding of the stabilizer under the thermal conditions of the manufacturing of "HR"-type containers.

Thanks to the elimination of the guiding on the stabilizer, it is possible to make the stabilizer out of plastic material.

Making the stabilizer out of plastic material makes it possible to achieve a substantial weight reduction and therefore, by comparison with the previous production in metal, a reduction of the weight of the stabilizer.

Thanks to this weight reduction, an increase in the manufacturing rates of the containers is advantageously obtained, in particular because of the fact that the speed of the descent and ascent cycle of the nozzle nose comprising the stabilizer can be increased.

Advantageously, the weight reduction that is obtained by making the stabilizer out of plastic material is particularly favorable to the use of a linear motor as actuating means associated with the nozzle nose.

Actually, the reduction of the on-board weight makes possible a greater freedom in the selection of said actuating means.

Advantageously and by comparison with a pneumatic jack used heretofore, the linear motor makes it possible in particular to control with a greater precision the movement of the nozzle nose and therefore that of the stabilizer.

Thanks to the use of a linear motor, it is possible to vary the speed, acceleration and/or deceleration, during the movement of the nozzle nose between the raised and lowered positions and consequently that of the stabilizer.

Advantageously, the linear motor makes it possible to carry out deceleration at the end of travel in such a way that the contact between the stabilizer occupying its bottom position and the neck of a preform is less rough than before, limiting, and even thus eliminating, the risks of damage to the blocking means of the stabilizer or else deterioration of the neck of the preform.

Advantageously, the linear motor offers a facility and a rapidity of use during its parameterization (speed, etc.), which is most particularly advantageous during a change in manufacturing between a given container and another container having, for example, a neck of different dimensions.

The selection of the plastic material for the stabilizer contributes to reducing the risks of deterioration of the neck of the preform, a stabilizer made of plastic material being less abrasive in the case of contact with a preform (made of plastic material such as PET) that cannot, by comparison, be that of a stabilizer made of metal.

The use of a stabilizer made of plastic material and a linear motor is advantageously combined to reduce the risks of deterioration of the neck of the preforms transformed into containers.

According to other characteristics of the invention:
The stabilizer is made of plastic material;
The actuating means associated with said nozzle nose consist of a linear motor;
Said at least one guide means is carried by the nozzle body;
Said at least one guide means consists of at least one pair of guide rings, axially superposed in one another,
The stabilizer is attached in a detachable manner to the tubular intake element by attachment means that consist of at least one elastically deformable element;
The nozzle comprises return means of the stabilizer toward the bottom position that are arranged axially above said guide means;
The return means consist of a compression spring whose upper end is axially supported on a radial support surface of the nozzle body;
The return means consist of a compression spring whose lower end is axially supported on a radial support surface that comprises an annular collar that is integral with the tubular intake element;
The nozzle comprises at least stop means that, determining the bottom position, consist of a stop surface that comprises the nozzle nose and against which a shoulder of the stabilizer abuts.

BRIEF DESCRIPTION OF THE DRAWINGS

Other characteristics and advantages of this invention will emerge from reading the following detailed description for the understanding of which reference will be made to the drawings in which.

DETAILED DESCRIPTION OF THE PREFERRED EMBODIMENTS

In the description below, the "axial" orientations along a main axis X of the molding unit and the "radial" orientations at right angles to said axis will be adopted in a nonlimiting manner and to facilitate the understanding thereof.

In a nonlimiting manner, the terms "top" or "bottom" as well as "upper" or "lower" with reference to the axial orientation, and "outside" or "inside" with reference to the radial orientation and in relation to the axis X will be used.

FIGS. 3 to 6 show a molding unit 10 according to an embodiment of the invention provided in a nonlimiting manner.

The molding unit 10 for the manufacturing of "HR"-type containers is able to equip a manufacturing machine, in particular of rotary design, whose unit 10 then constitutes one of the units (or stations) that are distributed circumferentially in a uniform manner around the axis of rotation of the machine.

Below, the molding unit 10 according to said embodiment of the invention will be described by comparison with that of the state of the art described above and shown in FIG. 1, with the same reference numbers referring to the same means.

Figure 2:
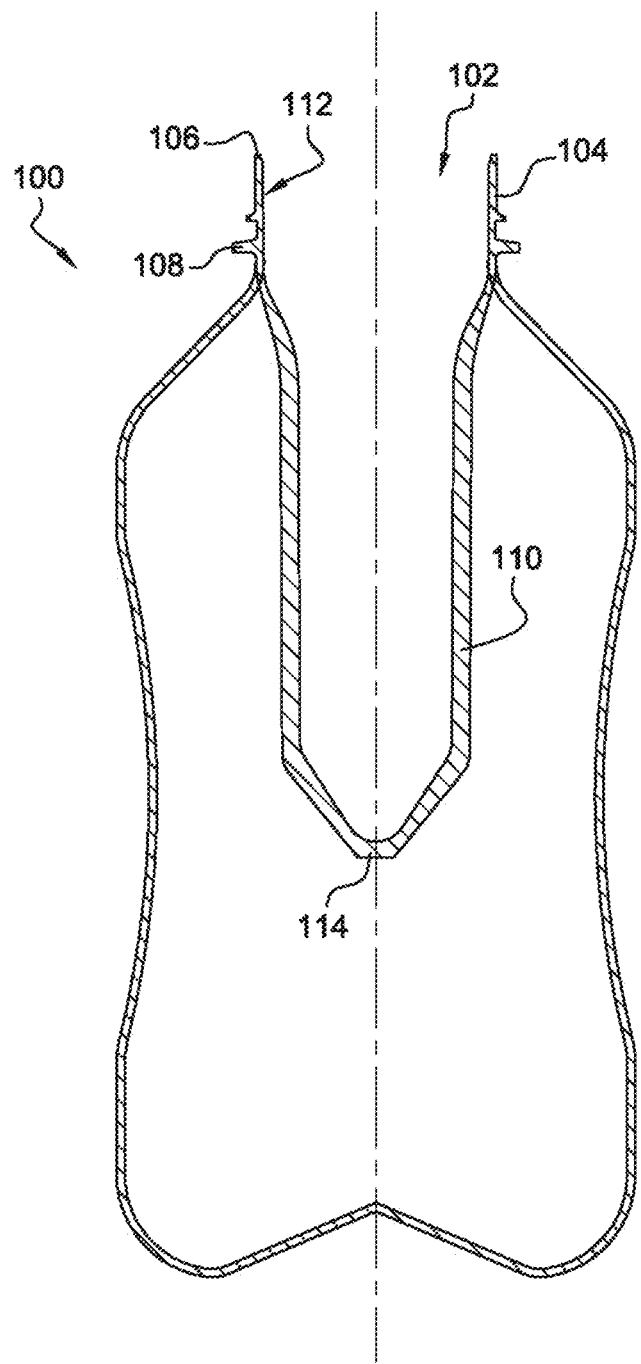
FIG. 2 is a cutaway view that shows an example of a preform made of plastic material designed to be transformed into a container.

The molding unit 10 is designed for the manufacturing of "HR"-type containers, with the containers being obtained by blow molding or by stretch blow molding from preforms 100 made of plastic material such as the preform shown in FIG. 2.

The preform 100 comprises a neck 104 equipped with a rim 106 that circumferentially delimits an opening 102 for access inside the preform.

As shown in FIGS. 3 to 6, the molding unit 10 comprises at least one "HR"-type mold 12 associated with a nozzle 14.

Figure 3:
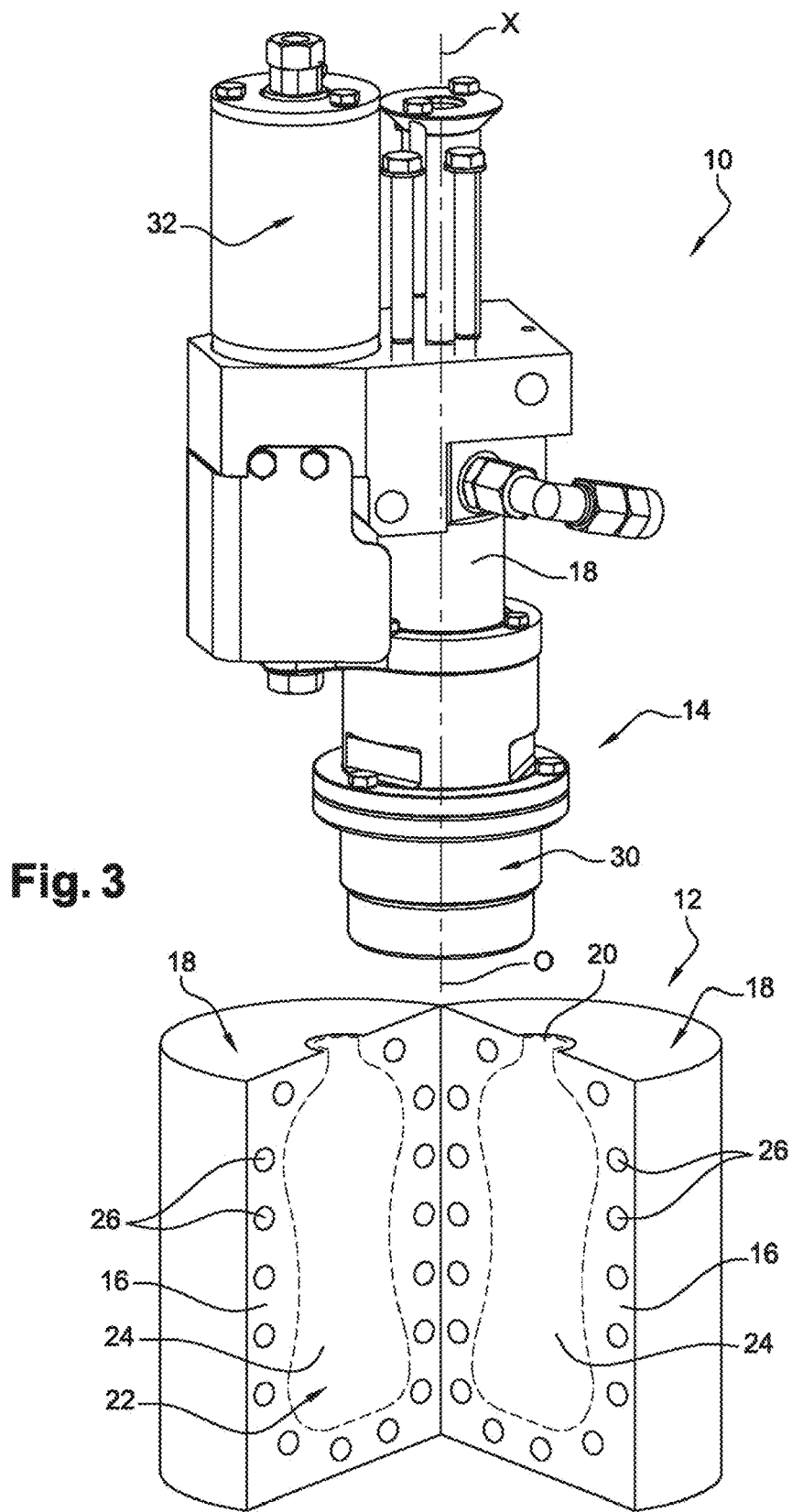
FIG. 3 is a perspective view that shows a molding unit for the manufacturing of "HR"-type containers according to an embodiment of the invention and that respectively illustrates a nozzle of said unit comprising actuating means formed by a linear electric motor and a mold that occupies its open position.
Figure 5:
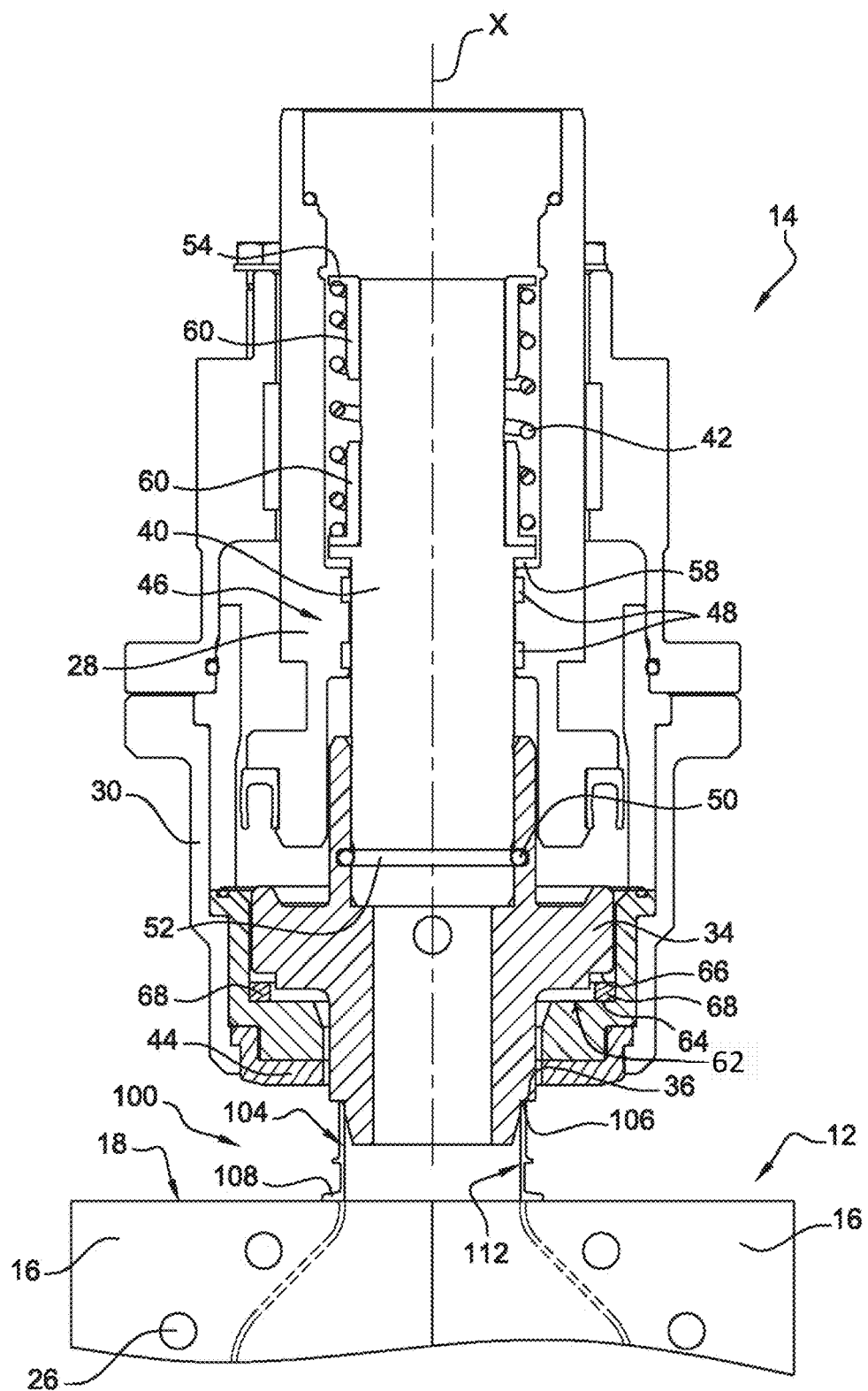
FIG. 5 is an axial cutaway view of a molding unit according to FIG. 3 that shows, during the descent toward its lowered position, an intermediate position of the nozzle nose in which the stabilizer works with the neck of a preform in place in the mold in the closed position.
Figure 6:
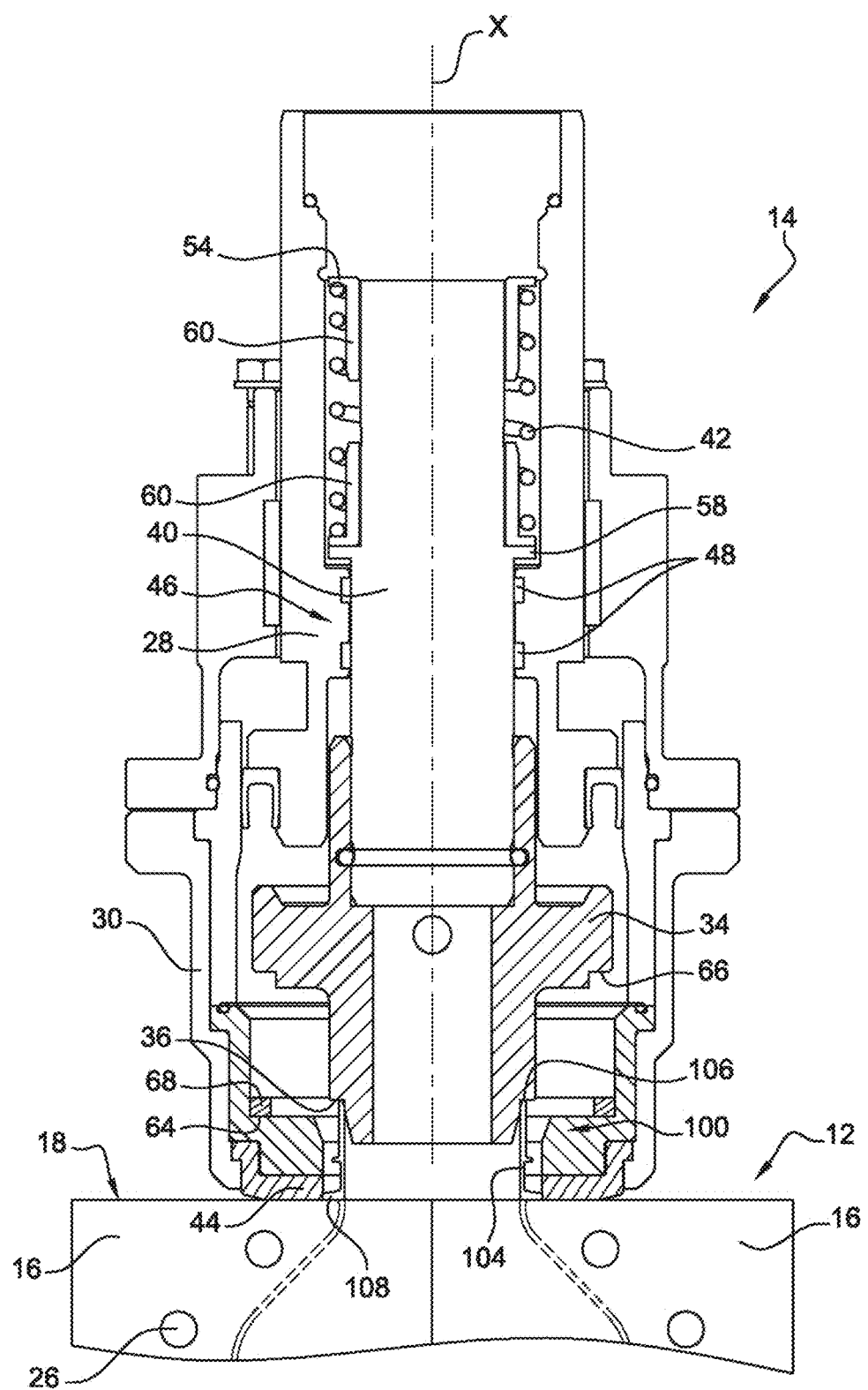
FIG. 6 is an axial cutaway view of a molding unit according to FIG. 3 that shows the nozzle in the lowered blow-molding position and the mold in the closed position and that illustrates a preform kept in position by the stabilizer in the top position and whose neck is covered by the nozzle nose.

The mold 12 comprises at least two half-molds 16 that are mounted to move between at least one open position illustrated in FIG. 3 and a closed position illustrated in FIGS. 5 and 6.

The mold 12 is of the "portfolio" type, and the half-molds 16 are mounted to move in rotation around an axis O of rotation (see FIG. 3).

In the closed position, the joined half-molds 16 delimit an upper surface 18 that comprises an orifice 20 emptying into a molding cavity 22 that is delimited at least by a molding impression 24 of each half-mold 16.

The half-molds 16 are then adjacent along a parting line P that extends axially.

Preferably, the orifice 20 comprises a peripheral counterbore made in the surface 18 and designed to accommodate the collar 108 of the preform 100.

In the case of a manufacturing of the "HR"-type container, each molding impression 24 is able to be heated by associated heating means 26 that said mold 12 comprises.

Figure 4:
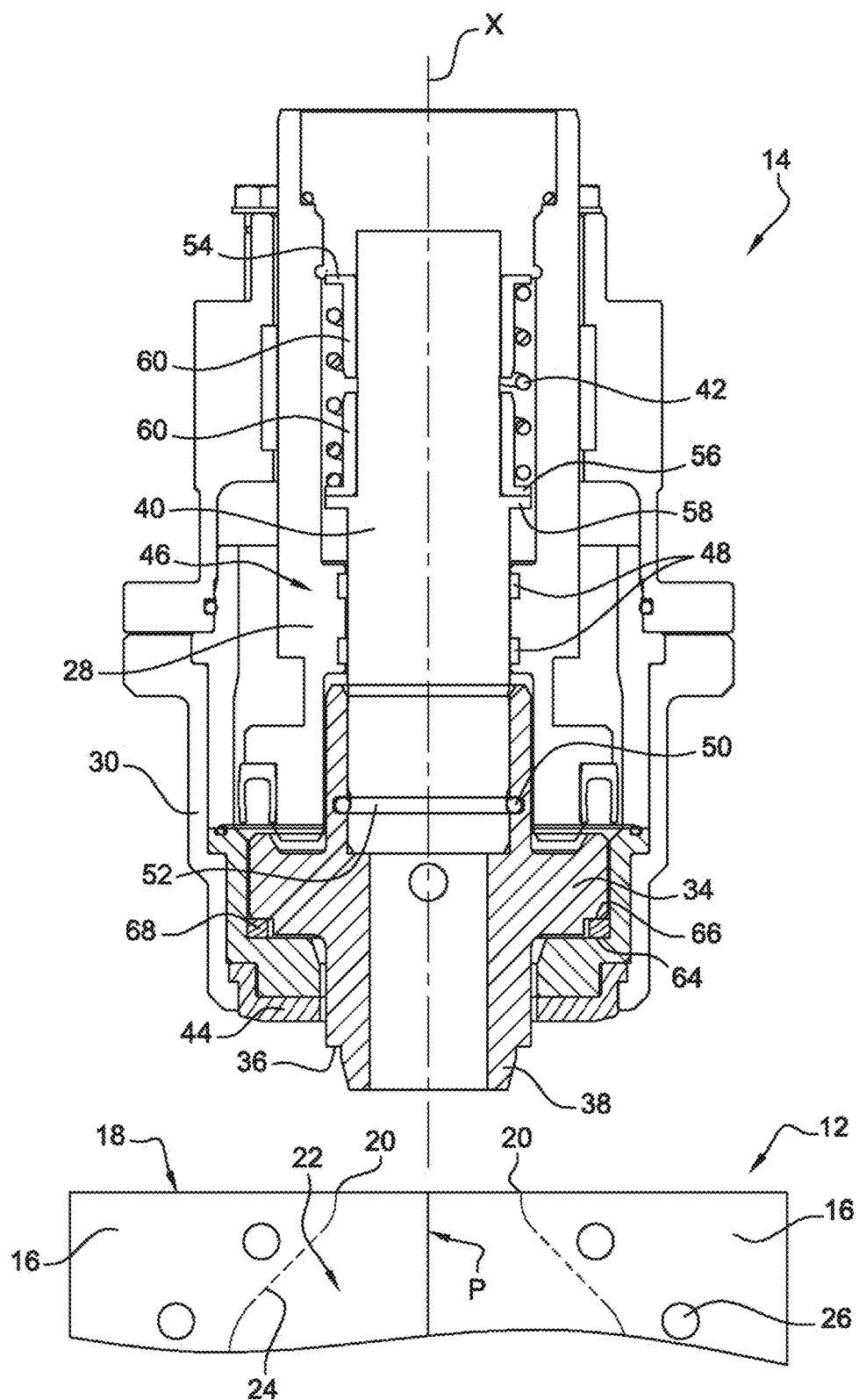
FIG. 4 is a view of a molding unit according to FIG. 3 that shows in axial cutaway the nozzle in the raised position and that illustrates a stabilizer that is made in accordance with the teachings of the invention and returned elastically into the bottom position by a spring acting on the tubular element.

The nozzle 14 of the molding unit 10 partially shown in FIGS. 4 to 6 comprises at least one nozzle body 28 and a nozzle nose 30.

The nozzle nose 30 is mounted to move axially in relation to said nozzle body 28 between a raised position above the mold illustrated in FIG. 4 and a lowered blow-molding position illustrated in FIG. 6.

In FIG. 4, the mold 12 is shown by convenience in the closed position. However, when the nozzle 14 occupies said raised position, the mold 12 is then generally in the open position. The mold 12 of the molding unit 10 occupies its open position when, for example, it is on standby for the insertion of a preform or for releasing a manufactured container that is extracted by transfer means (not shown), such as a clamp.

In the lowered blow-molding position, the nozzle nose 30 rests against the upper surface 18 of the occupying mold 12 in the closed position.

The nozzle nose 30 then establishes an airtight connection so as to inject at least one pressurized fluid, generally air, inside the preform 100 through said opening 102 of the neck 104 of the preform 100.

Preferably, the nozzle nose 30 comprises at its lower axis end sealing means 44 designed to work with the surface 18 to ensure said airtight connection. For some applications, the sealing means 44 such as a seal can be in contact with the collar 108 of the preform 100.

The nozzle nose 30 is controlled axially in movement between said raised and lowered positions by the actuating means 32 that the nozzle 14 comprises.

Preferably, the actuating means 32 associated with said nozzle nose 30 consist of a linear motor shown in FIG. 3.

Advantageously, the linear motor 32 is electric.

The nozzle 14 advantageously comprises a stabilizer 34 that primarily comprises a support surface 36 designed to work with the rim 106 of the neck 104 and blocking means 38.

The blocking means 38 are designed to be inserted inside the neck 104 to immobilize in position the manufactured container, in particular during the opening of the mold 12 for the purpose of initiating the extraction of said container outside of the mold 12.

The stabilizer 34 is housed inside the nozzle nose 30 and forms a movable apparatus with a tubular element 40.

The so-called tubular intake element 40 is hollow in the center to make possible, during the blow molding, the passage of at least one pressurized fluid from a pressurized fluid source supplying the molding unit 10 to the preform 100 to be transformed into a container.

The tubular element 40 is able to be passed through centrally by a stretching rod when the nozzle 14 of the molding unit 10 comprises such a rod for carrying out the manufacturing of the container by stretch blow molding.

The stabilizer 34 is driven axially with said nozzle nose 30 when said nose 30 is moved by the actuating means that are advantageously formed by the linear motor 32.

The stabilizer 34 is able to slide axially relative to said nozzle nose 30 between at least a top position illustrated in FIGS. 5 and 6 and a bottom position illustrated in FIG. 4.

The bottom position corresponds to a position toward which said movable apparatus, and most particularly the stabilizer 34, is returned elastically by return means 42.

Preferably, the return means 42 are formed by at least one spring, such as a compression spring, which stresses axially downward said movable apparatus formed from the stabilizer 34 and the tubular intake element 40.

As shown in FIG. 4, the stabilizer 34 in the bottom position extends in part projecting in relation to the nozzle nose 30, with the blocking means 38 extending in particular axially toward the bottom beyond the sealing means 44 carried by the nozzle nose 30.

As shown in FIGS. 5 and 6, the stabilizer 34 occupies said top position in the presence of a preform 100, when the stabilizer 34 works with the neck 104 of the preform 100 that brings about the axial movement upward of the stabilizer 34 relative to the nozzle nose 30, against the return force exerted by the spring 42.

By its support surface 36 on the rim 106 of the neck 104 of the preform 100, the stabilizer 34 exerts a stabilization force that is oriented axially downward so as to flatten the collar 108 of the preform 100 against the surface 18 of the mold 12, to keep it axially in position for the purpose of blow molding.

The tubular intake element 40 is guided by axial sliding in relation to the nozzle body 28 by at least one guide means 46 that is inserted radially between said nozzle body 28 and said tubular element 40.

The stabilizer 34 is attached to said tubular intake element 40 in such a way that, when thus coupled together, a movable apparatus is created.

Advantageously, the stabilizer 34 is guided in relation to the nozzle body 28 only by said at least one guide means 46.

Preferably, said at least one guide means 46 is carried by the nozzle body 28. As a variant, said at least one guide means 46 is carried by the tubular intake element 40.

Advantageously, said at least one guide means 46 carried by the nozzle body 28 is arranged axially above the stabilizer 34 in such a way as to protect said at least one guide means 46 by removing said at least one guide means 46 from the lower end of the nozzle nose 30 where the thermal stresses are the most significant.

In the embodiment, said at least one guide means 46 advantageously consists of at least one pair of guide rings 48, axially superposed in one another.

Circumferentially with the nozzle nose 30, the stabilizer 34 has a specific radial play that is in particular suitable for allowing thermal expansion under the action of the heat transmitted by the "HR"-type mold 12, so as to guarantee to the stabilizer 34 a freedom of axial sliding between said top and bottom positions, without the risk of jamming.

Figure 1:
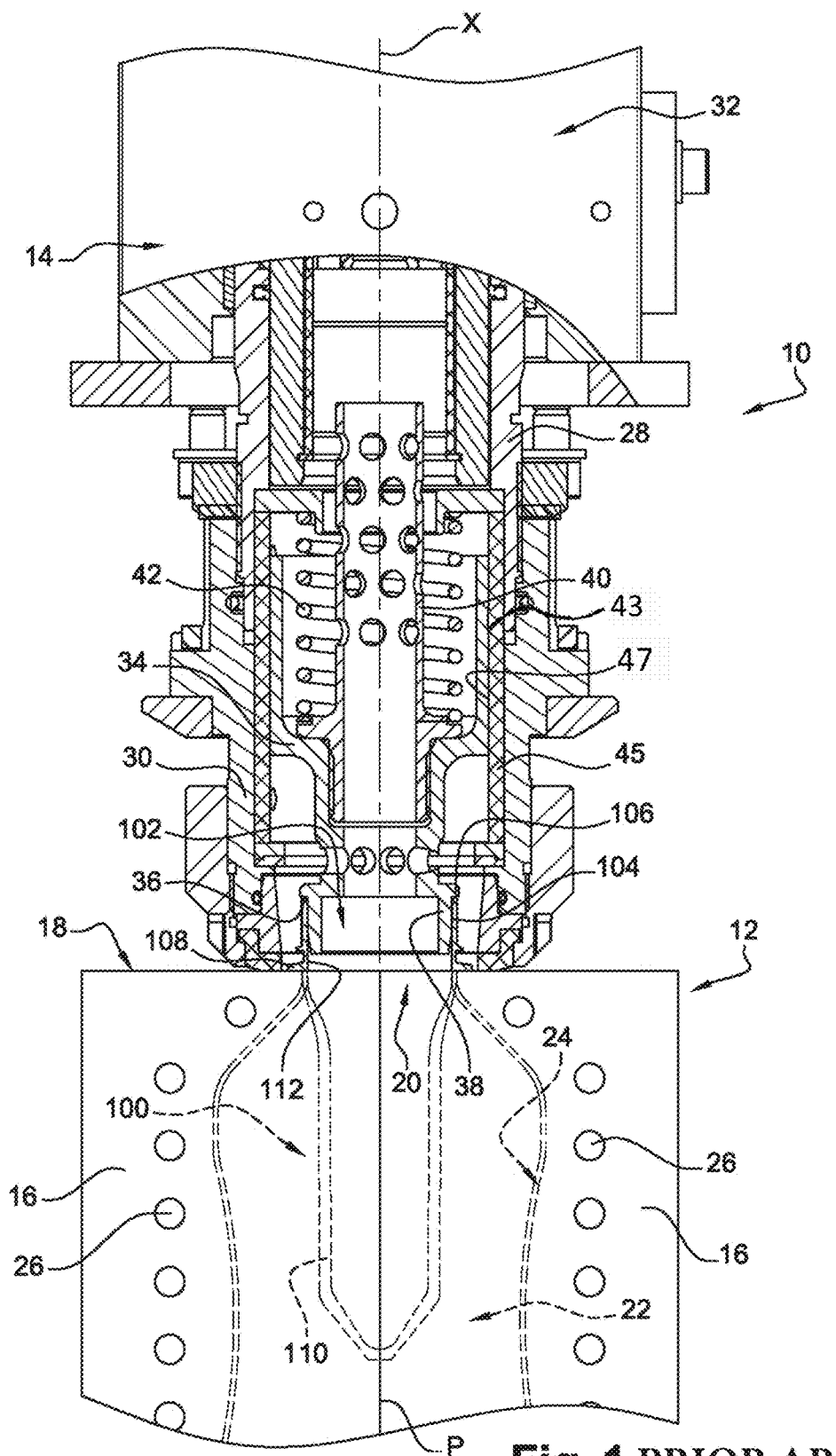
FIG. 1 is an axial cutaway view of a molding unit for a machine for manufacturing "HR"-type containers that shows a mold in the closed position comprising a preform and an associated nozzle in the lowered blow-molding position and that illustrates a stabilizer according to the state of the art in the top position.

By comparison with FIG. 1 illustrating the state of the art, the stabilizer 34 is free to slide in relation to the nozzle body 28 as in relation to the nozzle nose 30.

The axial guiding of the stabilizer previously implemented by cooperation between the outer cylindrical surface 43 of an upper segment of the stabilizer with the inner cylindrical surface 47 for guiding the jacket 45 therefore no longer exists, with the jacket 45 consequently being advantageously eliminated.

Owing to the fact that the stabilizer 34 is guided only by said at least one guide means 46 carried by the nozzle body 28 and working with the tubular element 40 to which said stabilizer is attached, the stabilizer 34 can advantageously be made of plastic material.

By comparison with a metal stabilizer according to the state of the art, the use of plastic material for the stabilizer 34 offers numerous advantages.

The use of plastic material for the stabilizer makes possible a gain in weight in relation to an identical stabilizer that would be made of metal, as was systematically the case heretofore in the state of the art for an application to the manufacturing of "HR"-type containers.

Advantageously, the dimensions of the stabilizer 34 can be optimized for reducing the dead volumes inside the nozzle nose 30, with the weight reduction obtained for the benefit of the changing for the plastic material making it possible where, by comparison, this would have been impossible when operating with metal.

Thanks to the weight reduction obtained by the use of plastic material for producing the stabilizer 34, the rates are advantageously increased.

The reduction of the on-board weight makes it possible to increase the speed of motion of the nozzle nose 30 between the raised and lowered positions.

The use of a linear motor 32 for driving the nozzle nose 30 is also part of obtaining higher rates, in particular because of the accelerations suitable for such a motor.

Advantageously, the linear motor 32 makes it possible to carry out deceleration at the end of travel that reduces the kinetic energy dissipated during the docking between the stabilizer 34 made of plastic material and the neck 104 of the preform 100.

Advantageously, and by comparison with a metal material, the use of a stabilizer 34 made of plastic material makes it possible to limit the deterioration that can occur in the neck 104 of the preform 100.

Preferably, the stabilizer 34 is attached in a detachable manner to the tubular intake element 40 by the attachment means 50 constituted by at least one elastically deformable element.

Advantageously, said at least one elastically deformable element that forms the means 50 for attachment of the stabilizer 34 with the tubular intake element 40 is an annular retaining ring.

Preferably, the annular retaining ring 50 is carried by the stabilizer 34 and is accommodated in an annular groove 52 complementary to the tubular element 40.

Advantageously, the nozzle 14 comprises means 42 for returning the stabilizer 34 toward the bottom position that are arranged axially above said at least one guide means 46.

Thanks to such an arrangement and by comparison with the state of the art, the return means 42 of the stabilizer 34 are advantageously best protected from the thermal stresses that have existed heretofore, in particular because of the transfer of heat that takes place between the mold 12 and the nozzle nose 30 during the manufacturing of the "HR"-type containers.

Preferably, the return means 42 consist of a compression spring whose upper end axially rests on a radial support surface 54 of the nozzle body 28.

Preferably, the lower end of the compression spring 42 constituting the return means axially rests on a radial support surface 56.

Advantageously, said radial support surface 56 of the spring 42 belongs to an annular collar 58 that is integral with the tubular intake element 40.

The return means 42 axially stress the stabilizer 34 toward the bottom position, without, however, being directly in contact with the stabilizer 34, which is advantageous when said stabilizer 34 is made of plastic material.

Preferably, a support ring 60 is inserted axially between the upper end of said spring 42 and said radial support surface 54 of the nozzle body 28 and/or between the lower end of the spring 42 and said radial support surface 56 carried by the annular collar 58 of the tubular element 40.

The nozzle 14 comprises stop means axially determining at least one of said bottom and top positions of the movable apparatus formed by the stabilizer 34 and the tubular element 40.

Advantageously, the nozzle 14 comprises stop means 62 that, determining the bottom position, consist of a stop surface 64 that comprises the nozzle nose 30 and against which a shoulder 66 of the stabilizer 34 abuts.

Preferably, an elastically deformable element 68 is inserted axially between said shoulder 66 of the stabilizer and the stop surface 64 carried by the nozzle nose 30.

The operation of the molding unit 10 is illustrated by FIGS. 4 to 6.

In FIG. 4, the nozzle 14 is in the raised position, and the mold 12 is, in the absence of a preform 100, in the open position. A preform 100 is then brought by transfer means (not shown), such as a clamp, and inserted into the mold 12 whose half-molds 16 are moved toward the closed position.

Simultaneously, the actuating means 32 are controlled to cause the descent of the nozzle nose 30 that leaves the raised position to be directed toward the lowered position.

During the descent, the projecting stabilizer 34 then enters into contact with the neck 104 of the preform 100; the blocking means 38 penetrate through the opening 102 inside the neck 104 of the preform 100.

As illustrated by FIG. 5, the stabilizer 34 then works via its support surface 36 with the rim 106 of the preform 100. With the preform 100 resting by its collar 108 against the surface 18 of the mold surrounding the orifice 20, the stabilizer 34 is axially blocked in such a way that the continuation of the descent of the nozzle nose 30 is accompanied by a sliding of the stabilizer 34 relative to the nozzle nose 30.

The descent of the nozzle nose 30 is accomplished when it has reached the lowered blow-molding position shown in FIG. 6, with the seal 44 resting against the surface 18 of the mold 12.

The stabilizer 34 then occupies its top position in which the stabilizer 34, stressed axially downward by the spring 42 acting on the collar 58 of the tubular element 40, applies on the neck 104 of the preform 100 a force that is suitable for keeping it in a specific axial position for the purpose of its transformation into a container.

The invention claimed is:

1. A molding unit (10) for the manufacturing of containers by blow molding or by stretch blow molding from preforms (100) made of plastic material comprising a neck (104) equipped with a rim (106) circumferentially delimiting an opening (102) for access inside said preform (100), with said molding unit (10) comprising at least:
    a mold (12) that comprises at least two half-molds (16) mounted to move between at least one open position and one closed position in which the joined half-molds (16) delimit an upper surface (18) comprising an orifice (20) that empties into a molding cavity (22) delimited at least by a molding impression (24) of each half-mold,
    a heating device (26) associated with said mold (12), the heating device (26) arranged to heat each molding impression of each half mold, the mold for forming heat resistant containers,
    a nozzle (14) comprising at least one nozzle body (28) and one nozzle nose (30) that is mounted to move axially in relation to said nozzle body (28) between a raised position above the mold (12) and a lowered blow-molding position, with said nozzle nose (30) being controlled axially in movement between said raised and lowered positions by an actuating device (32), and
    a stabilizer (34) comprising a support surface (36) designed to work with the rim (106) of the neck (104) and a blocking device (38) in position designed to be inserted inside the neck (104), with said stabilizer (34) being housed inside the nozzle nose (30) and forming with a tubular element (40) for intake of at least one pressurized fluid a movable apparatus that, driven with said nozzle nose (30), is able to slide axially relative to said nozzle nose (30) between at least one top position and one bottom position,
    wherein the tubular element (40) is guided by axial sliding in relation to the nozzle body (28) by at least one guide device (46) that is inserted radially between said nozzle body (28) and said tubular intake element (40), and the stabilizer (34), attached to said tubular element (40), is guided in relation to the nozzle body (28) only by said at least one guide device (46).

2. The molding unit according to claim 1, wherein said stabilizer (34) is made of plastic material.

3. The molding unit according to claim 1, wherein the actuating device (32) associated with said nozzle nose (30) includes a linear motor.

4. The molding unit according to claim 1, wherein said at least one guide device (46) is carried by the nozzle body (28).

5. The molding unit according to claim 1, wherein said at least one guide device (46) includes at least one pair of guide rings (48), axially superposed in one another.

6. The molding unit according to claim 1, wherein the stabilizer (34) is attached in a detachable manner to the tubular intake element (40) by an attachment device (50) constituted by at least one elastically deformable element.

7. The molding unit according to claim 1, wherein the nozzle (14) comprises a return device (42) that returns the stabilizer (34) towards the bottom position that are arranged axially above said at least one guide device (46).

8. The molding unit according to claim 7, wherein the return device (42) includes a compression spring whose upper end axially rests on a radial support surface (54) of the nozzle body (28).

9. The molding unit according to claim 7, wherein the return device (42) includes a compression spring whose lower end axially rests on a radial support surface (56) that comprises an annular collar (58) that is integral with the tubular intake element (40).

10. The molding unit according to claim 1, wherein the nozzle (14) comprises at least a stop device (62) that, determining the bottom position, includes a stop face (64) that comprises the nozzle nose (30) and against which a shoulder (66) of the stabilizer (34) abuts.

11. The molding unit according to claim 2, wherein the actuating device (32) associated with said nozzle nose (30) includes a linear motor.

12. The molding unit according to claim 2, wherein said at least one guide device (46) is carried by the nozzle body (28).

13. The molding unit according to claim 2, wherein said at least one guide device (46) includes at least one pair of guide rings (48), axially superposed in one another.

14. The molding unit according to claim 2, wherein the stabilizer (34) is attached in a detachable manner to the tubular intake element (40) by an attachment device (50) constituted by at least one elastically deformable element.

15. The molding unit according to claim 2, wherein the nozzle (14) comprises a return device (42) that returns the stabilizer (34) toward the bottom position that are arranged axially above said at least one guide device (46).

16. The molding unit according to claim 8, wherein the return device (42) includes a compression spring whose lower end axially rests on a radial support surface (56) that comprises an annular collar (58) that is integral with the tubular intake element (40).

* * * * *